(No Model.)
A. C. FERGUSON.
MULTIPLEX ELECTRIC LIGHT.
No. 334,365. Patented Jan. 12, 1886.
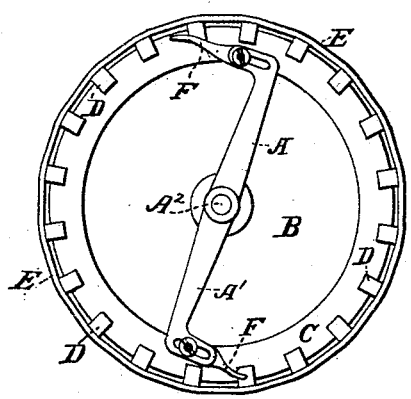
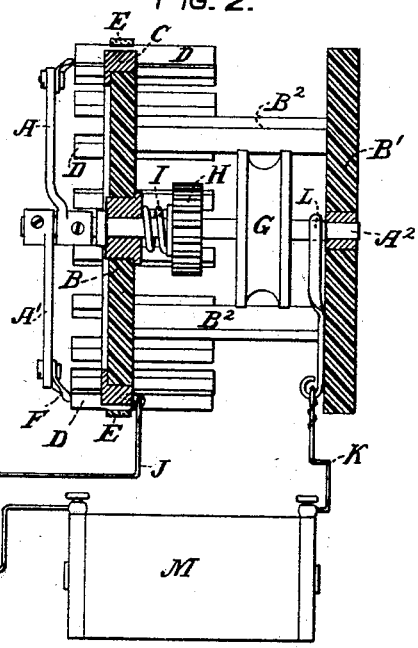
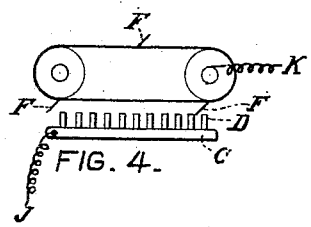
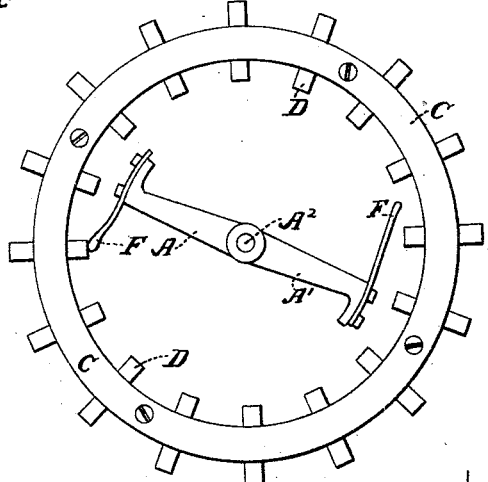
WITNESSES:
F. N. Young
Jesse P. Mott
INVENTOR:
Arthur C. Ferguson

UNITED STATES PATENT OFFICE.

ARTHUR C. FERGUSON, OF SARATOGA, NEW YORK, ASSIGNOR, BY MESNE ASSIGNMENTS, TO D. ROGERS NOBLE, OF JERSEY CITY, NEW JERSEY.

MULTIPLEX ELECTRIC LIGHT.

SPECIFICATION forming part of Letters Patent No. 334,365, dated January 12, 1886.

Application filed February 19, 1885. Serial No. 156,477. (No model.)

*To all whom it may concern:*

Be it known that I, ARTHUR C. FERGUSON, a citizen of the United States, residing at Saratoga, in the county of Saratoga and State of New York, have invented a Multiplex Electric Light, of which the following is a specification.

My invention relates to the production of a line or band of electric light by means of a series of electrodes placed in a line and connected with one pole of an electric generator, and by rapidly passing an electrode or electrodes of the other pole into and out of contact with the electrodes of said series, thus closing and breaking the current, and thereby creating a series of adjacent sparks or jets of light along said line of electrodes.

The object of my invention is to produce a serviceable electric light for the street, for buildings, or a light for fanciful effects.

Figure 1 represents a face view of one form of my apparatus, being a disk with rotary arms brought in connection with a circle of electrodes. Fig. 2 is a sectional side elevation of same apparatus. Figs. 3 and 4 are modification views.

Similar letters of reference refer to similar parts throughout the several views.

In Fig. 1, B is a rubber disk incased by a metallic band, C, and in the slotted sides thereof is a line of electrodes, D, which are held in their place by rubber band E.

A and A' represent rotary arms supported by shaft $A^2$. At the end of said rotary arms are spring-fingers F, which are electrodes connected by the rotary arms with the shaft $A^2$, and thus connected to one pole of the electric generator at K, Fig. 2, while the electrodes in the slotted metallic band C are connected with the other pole of the electric battery N, as shown in Fig. 2.

Fig. 2 shows the frame-work of my apparatus. The shaft $A^2$ is supported at the face end of the apparatus by the disk B, and at the other end by metallic plate or wooden strip B'. On either side of shaft $A^2$ are posts $B^2$, holding the parts of the apparatus in place. The shaft $A^2$ is to be operated by any suitable motor having connections with itself (the shaft) through pulley G or pinion H, or any other suitable means.

One pole of the electric generator N is connected to metallic slotted band C, thus connecting the line of the electrodes D, and the other pole of electric generator is connected to the spark-coil M and united with the shaft $A^2$ by metallic spring L, bearing on the shaft.

The revolving of shaft $A^2$ moves the spring-fingers F F of the rotary arms A and A', connected to the pole at K, bringing them alternately in contact with the electrodes D, which are connected with the other pole at J, and thus by rapidly closing and breaking the current produces a line of adjacent jets or sparks of light, or band of light, apparently continuous. The spring I holds the electrode spring-fingers against the electrodes. The electrode spring-fingers can be arranged so as to close and break the circuit at the same instant; or one spring-finger can be left off or more added by additional arms supported by the shaft.

To increase the brilliancy of the light, I introduce in the electric circuit spark-coil M, or any other spark-producing device. I may use a dynamo-machine or any other generator of electricity in place of a galvanic battery.

Figs. 3 and 4 are modification views of my apparatus. In Fig. 3 the electrodes D radiate toward the shaft $A^2$ instead of being parallel to it, as shown in Fig. 2. In Fig. 4 the metallic plate C is in a straight line supporting electrodes D, instead of being in circle. They are connected with one pole of electric generator at J, and the spring-fingers F are attached to a metallic flexible band, instead of arms A and A'. The other pole is connected with wheel at K, said wheel being rotated by the same motive power heretofore mentioned.

In Fig. 4 the line of light is straight instead of a circle, as shown in the other views; but the line of light produced in modifications Nos. 3 and 4 is of the same character as in the chief specification.

I claim as my invention—

1. The combination, in an electric lamp, of a range of carbons, a metallic contact to connect such range of carbons in an electric circuit, a spark-producing contact, and means for rapidly moving such contact across the range of carbons, for closing and opening the circuit and producing the range of sparks, substantially as specified.

2. The combination, in an electric lamp, of a metallic ring connected to one of the circuit-wires, a range of carbon pencils around the said ring, means for holding the carbons in contact with the ring, and a shaft and arm connected to the other circuit-wire carrying a contact of carbon or other material, and mechanism for revolving the shaft and arm and making and breaking contact with the circular range of carbon pencils, substantially as specified.

3. The combination, in an electric lamp, with the range of carbon pencils and a moving contact for the same, of circuit-connections, one of which is to the range of carbons and the other to the moving contact, and an induction-coil in the electric circuit, for lengthening the spark at the electrodes, substantially as specified.

ARTHUR C. FERGUSON.

Witnesses:
CHAS. C. VAN KIRK,
EDWIN F. BURDICK.